United States Patent
Kitano et al.

(10) Patent No.: US 12,038,542 B2
(45) Date of Patent: Jul. 16, 2024

(54) CONTROL DEVICE, RADIATION DETECTOR, CONTROL METHOD, AND CONTROL PROGRAM

(71) Applicant: FUJIFILM CORPORATION, Tokyo (JP)

(72) Inventors: Koichi Kitano, Kanagawa (JP); Kentaro Noma, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 418 days.

(21) Appl. No.: 17/505,642

(22) Filed: Oct. 20, 2021

(65) Prior Publication Data

US 2022/0137240 A1    May 5, 2022

(30) Foreign Application Priority Data

Oct. 30, 2020 (JP) .................. 2020-183113

(51) Int. Cl.
*G01T 1/175* (2006.01)
(52) U.S. Cl.
CPC .................... *G01T 1/175* (2013.01)
(58) Field of Classification Search
None
See application file for complete search history.

(56) References Cited

U.S. PATENT DOCUMENTS

| | | | | |
|---|---|---|---|---|
| 7,239,685 B2* | 7/2007 | Petrick | ............. | G01T 1/2985 378/116 |
| 7,365,337 B2* | 4/2008 | Tsuchino | ............. | A61B 6/4488 250/370.09 |
| 8,705,700 B2* | 4/2014 | Eguchi | ............. | A61B 6/4494 378/116 |
| 8,841,628 B2* | 9/2014 | Kitano | ............. | H04N 9/8205 250/393 |
| 8,933,413 B2* | 1/2015 | Kitano | ............. | H04N 9/8205 250/393 |
| 9,259,198 B2* | 2/2016 | Ohta | ............. | G01T 1/20188 |

(Continued)

FOREIGN PATENT DOCUMENTS

| JP | 2007-333383 A | 12/2007 |
|---|---|---|
| JP | 2010-259688 A | 11/2010 |

(Continued)

OTHER PUBLICATIONS

Translation of WIPO doc (Year: 2010).*

(Continued)

*Primary Examiner* — Thomas R Artman
(74) *Attorney, Agent, or Firm* — SOLARIS Intellectual Property Group, PLLC

(57) ABSTRACT

A radiation detector includes a memory controller and a sleep control unit. The sleep control unit supplies a power supply power to a main control unit and cuts off supply of the power supply power to at least a part other than the main control unit in a first power consumption reduction mode. In addition, the sleep control unit cuts off supply of the power supply power to at least a part of the main control unit and at least a part other than the main control unit in a second power consumption reduction mode. In addition, the memory controller prevents a volatile memory from being deactivated during the second power consumption reduction mode.

9 Claims, 9 Drawing Sheets

(56) References Cited

U.S. PATENT DOCUMENTS

| | | | |
|---|---|---|---|
| 9,453,923 B2* | 9/2016 | Eguchi | G01T 1/175 |
| 9,980,696 B2* | 5/2018 | Oda | A61B 6/467 |
| 10,485,506 B2* | 11/2019 | Oda | A61B 6/5211 |
| 10,503,244 B2* | 12/2019 | Eismann | G06F 1/266 |
| 11,020,080 B2* | 6/2021 | Oda | A61B 6/54 |
| 2005/0207534 A1* | 9/2005 | Petrick | G01T 1/2985 |
| | | | 378/114 |
| 2006/0054829 A1* | 3/2006 | Tsuchino | A61B 6/4488 |
| | | | 250/370.09 |
| 2012/0318991 A1* | 12/2012 | Ohta | A61B 6/4488 |
| | | | 250/336.1 |
| 2013/0140467 A1* | 6/2013 | Kitano | H04N 7/18 |
| | | | 250/394 |
| 2014/0183373 A1* | 7/2014 | Eguchi | H04N 5/32 |
| | | | 250/394 |
| 2014/0241502 A1* | 8/2014 | Kitano | G01T 1/247 |
| | | | 378/62 |
| 2015/0085980 A1* | 3/2015 | Kitano | H04N 25/713 |
| | | | 378/62 |
| 2016/0228087 A1* | 8/2016 | Oda | A61B 6/5211 |
| 2017/0322619 A1* | 11/2017 | Eismann | A61B 6/42 |
| 2017/0336520 A1* | 11/2017 | Okazawa | A61B 6/566 |
| 2018/0228459 A1* | 8/2018 | Oda | A61B 6/467 |
| 2020/0015770 A1* | 1/2020 | Oda | A61B 6/54 |
| 2022/0137240 A1* | 5/2022 | Kitano | G01T 1/175 |
| | | | 250/493.1 |

FOREIGN PATENT DOCUMENTS

| | | | | |
|---|---|---|---|---|
| JP | 2011-130878 A | | 7/2011 | |
| WO | WO-2010073894 A1 * | | 7/2010 | A61B 6/4233 |

OTHER PUBLICATIONS

English language translation of the following: Office action dated Mar. 5, 2024, from the JPO in a Japanese patent application No. 2020-183113 corresponding to the instant patent application. This office action translation is submitted now in order to supplement the understanding of the cited references which are being disclosed in the instant Information Disclosure Statement.

* cited by examiner

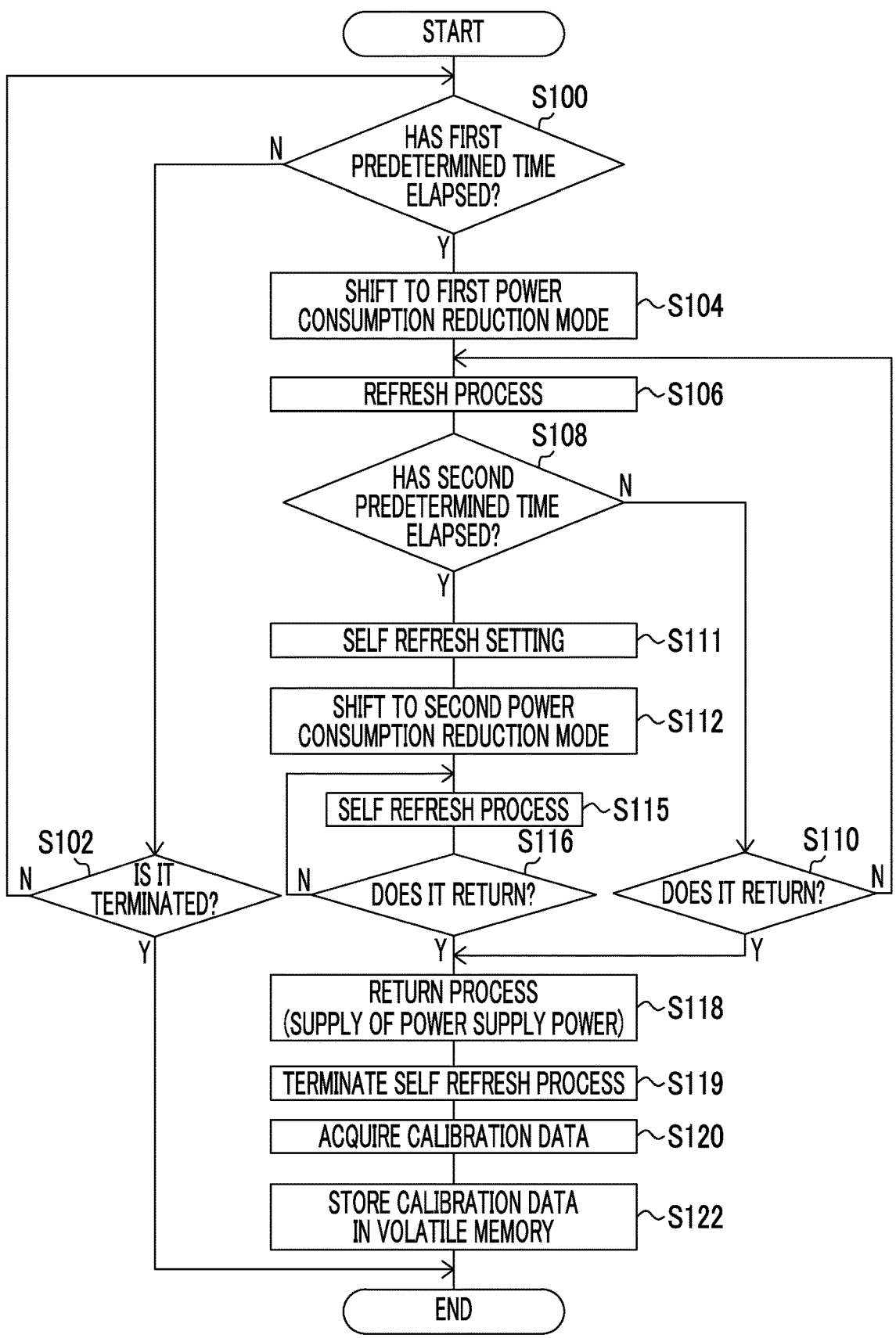

CONTROL DEVICE, RADIATION DETECTOR, CONTROL METHOD, AND CONTROL PROGRAM

CROSS-REFERENCE TO RELATED APPLICATIONS

The present application claims priority under 35 U.S.C. § 119 to Japanese Patent Application No. 2020-183113, filed on Oct. 30, 2020. The above application is hereby expressly incorporated by reference, in its entirety, into the present application.

BACKGROUND

1. Technical Field

The present disclosure relates to a control device, a radiation detector, a control method, and a control program.

2. Description of the Related Art

Generally, a radiation detector that generates a radiation image in response to radiation transmitted through a subject is known. It is known that the radiation detector shifts to a power consumption reduction mode in order to reduce power consumption. For example, in the technology disclosed in JP2011-130878A, a sleep state, which is a power-saving state, and a wake state, which is capable of transmitting and receiving signals, can be provided as drive states, and the technology has a sleep function of being a power-saving mode in which the sleep state and the wake state are alternately repeated at predetermined time intervals under a certain condition.

SUMMARY

By the way, it is desired that a return from the power consumption reduction mode is promptly performed. However, in the technology disclosed in JP2011-130878A, it may take time to return from the power-saving mode.

The present disclosure has been made in consideration of the above circumstances, and is to provide a control device, a radiation detector, a control method, and a control program capable of promptly performing a return from a power consumption reduction mode for suppressing the power consumption in the radiation detector.

In order to achieve the object described above, a first aspect of the present disclosure relates to a control device comprising at least one processor in a housing of a radiation detector including a main control unit, a radiation detection unit that generates an electric signal by a charge generated in response to emitted radiation and outputs the generated electric signal, a driving unit that drives the radiation detection unit in response to a control of the main control unit, a signal processing unit that generates image data in response to the electric signal input from the radiation detection unit, a communication unit that performs communication with an outside wirelessly or by wire, a volatile storage unit, and a power supply unit that supplies a power supply power to the main control unit, the driving unit, the signal processing unit, the communication unit, and the storage unit, in which the processor supplies the power supply power to the main control unit and cuts off supply of the power supply power to at least a part other than the main control unit in a first power consumption reduction mode, cuts off supply of the power supply power to at least a part of the main control unit and at least a part other than the main control unit in a second power consumption reduction mode, and prevents the storage unit from being deactivated during the second power consumption reduction mode.

A second aspect of the present disclosure relates to the control device according to the first aspect, in which the main control unit includes a main controller that controls the driving unit, the signal processing unit, and the communication unit, and a memory controller that performs a deactivation prevention process for the storage unit, and the processor cuts off supply of the power supply power to the main controller and supplies the power supply power to the memory controller in the second power consumption reduction mode.

A third aspect of the present disclosure relates to the control device according to the first aspect, in which the processor performs setting to cause the storage unit to perform a deactivation prevention process of deactivating the storage unit itself during the second power consumption reduction mode in a case in which the processor shifts to the second power consumption reduction mode.

A fourth aspect of the present disclosure relates to the control device according to the second aspect or the third aspect, in which the storage unit is an SDRAM, and the deactivation prevention is to execute a refresh process.

A fifth aspect of the present disclosure relates to the control device according to the second aspect or the third aspect, in which the storage unit is a DDR type SDRAM, and the deactivation prevention process is a refresh process.

A sixth aspect of the present disclosure relates to the control device according to any one of the first aspect to the fifth aspect, in which at least a part of the main control unit includes the driving unit and the signal processing unit.

A seventh aspect of the present disclosure relates to the control device according to any one of the first aspect to the sixth aspect, in which a partial region of the storage unit is prevented from being deactivated.

An eighth aspect of the present disclosure relates to the control device according to any one of the first aspect to the seventh aspect, in which the processor acquires the image data in response to the electric signal output from the radiation detection unit in a state in which the radiation is not emitted and stores the acquired image data in the storage unit in a case in which the processor returns from the first power consumption reduction mode or the second power consumption reduction mode.

A ninth aspect of the present disclosure relates to a control device comprising at least one processor in a housing of a radiation detector including a main control unit, a radiation detection unit that generates an electric signal by a charge generated in response to emitted radiation and outputs the generated electric signal, a driving unit that drives the radiation detection unit in response to a control of the main control unit, a signal processing unit that generates image data in response to the electric signal input from the radiation detection unit, a communication unit that performs communication with an outside wirelessly or by wire, a volatile storage unit, and a power supply unit that supplies a power supply power to the main control unit, the driving unit, the signal processing unit, the communication unit, and the storage unit, in which the processor cuts off supply of the power supply power to at least a part of the main control unit and at least a part other than the main control unit in a power consumption reduction mode, and prevents the storage unit from being deactivated during the power consumption reduction mode.

In addition, in order to achieve the object described above, a tenth aspect of the present disclosure relates to a radiation detector comprising a main control unit, a radiation detection unit that generates an electric signal by a charge generated in response to emitted radiation and outputs the generated electric signal, a driving unit that drives the radiation detection unit in response to a control of the main control unit, a signal processing unit that generates image data in response to the electric signal input from the radiation detection unit, a communication unit that performs communication with an outside wirelessly or by wire, a volatile storage unit, and the control device according to the present disclosure.

In addition, in order to achieve the object described above, an eleventh aspect of the present disclosure relates to a control method executed by a processor provided in a housing of a radiation detector including a main control unit, a radiation detection unit that generates an electric signal by a charge generated in response to emitted radiation and outputs the generated electric signal, a driving unit that drives the radiation detection unit in response to a control of the main control unit, a signal processing unit that generates image data in response to the electric signal input from the radiation detection unit, a communication unit that performs communication with an outside wirelessly or by wire, a volatile storage unit, and a power supply unit that supplies a power supply power to the main control unit, the driving unit, the signal processing unit, the communication unit, and the storage unit, the method comprising supplying the power supply power to the main control unit and cutting off supply of the power supply power to at least a part other than the main control unit in a first power consumption reduction mode, cutting off supply of the power supply power to at least a part of the main control unit and at least a part other than the main control unit in a second power consumption reduction mode, and preventing the storage unit from being deactivated during the second power consumption reduction mode.

In addition, in order to achieve the object described above, a twelfth aspect of the present disclosure relates to a control program that causes a processor provided in a housing of a radiation detector including a main control unit, a radiation detection unit that generates an electric signal by a charge generated in response to emitted radiation and outputs the generated electric signal, a driving unit that drives the radiation detection unit in response to a control of the main control unit, a signal processing unit that generates image data in response to the electric signal input from the radiation detection unit, a communication unit that performs communication with an outside wirelessly or by wire, a volatile storage unit, and a power supply unit that supplies a power supply power to the main control unit, the driving unit, the signal processing unit, the communication unit, and the storage unit, to execute a process comprising supplying the power supply power to the main control unit and cutting off supply of the power supply power to at least a part other than the main control unit in a first power consumption reduction mode, cutting off supply of the power supply power to at least a part of the main control unit and at least a part other than the main control unit in a second power consumption reduction mode, and preventing the storage unit from being deactivated during the second power consumption reduction mode.

According to the present disclosure, in the radiation detector, it is possible to promptly perform the return from the power consumption reduction mode for suppressing the power consumption.

BRIEF DESCRIPTION OF THE DRAWINGS

Exemplary embodiments according to the technique of the present disclosure will be described in detail based on the following figures, wherein:

FIG. 8 is a flowchart showing an example of a flow of a sleep process in a radiation detector according to Modification Example 1.

DETAILED DESCRIPTION

Hereinafter, an embodiment of the present invention will be described in detail with reference to the drawings. Note that the embodiment does not limit the present invention.

Figure 1:
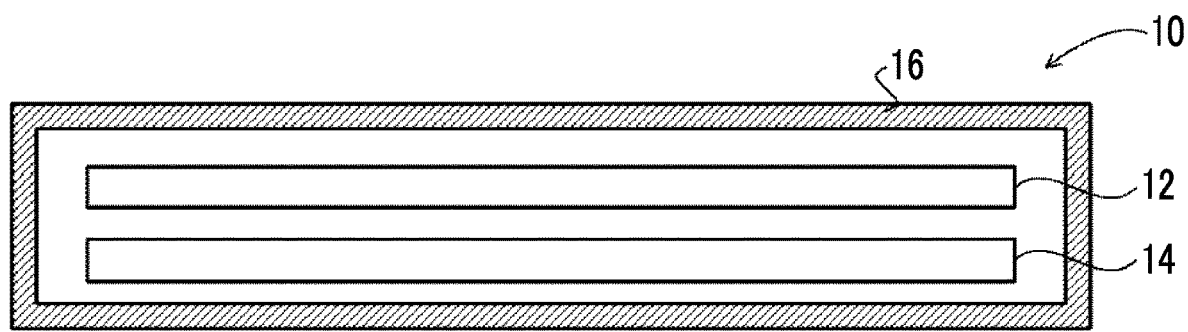
FIG. 1 is a diagram showing an example of a configuration of a radiation detector.

First, a configuration of a radiation detector 10 according to the present embodiment will be described with reference to FIG. 1. The radiation detector 10 according to the present embodiment has a function of detecting radiation and outputting a radiation image. More specifically, the radiation detector 10 has a function of detecting the radiation emitted from a radiation source (not shown) and transmitted through a subject, generating image data representing the radiation image, and outputting the generated image data. The radiation detector 10 according to the present embodiment is a so-called flat panel detector (FPD). As shown in FIG. 1, the radiation detector 10 according to the present embodiment comprises a radiation detection unit 12 and a circuit unit 14 in a housing 16.

Figure 2:
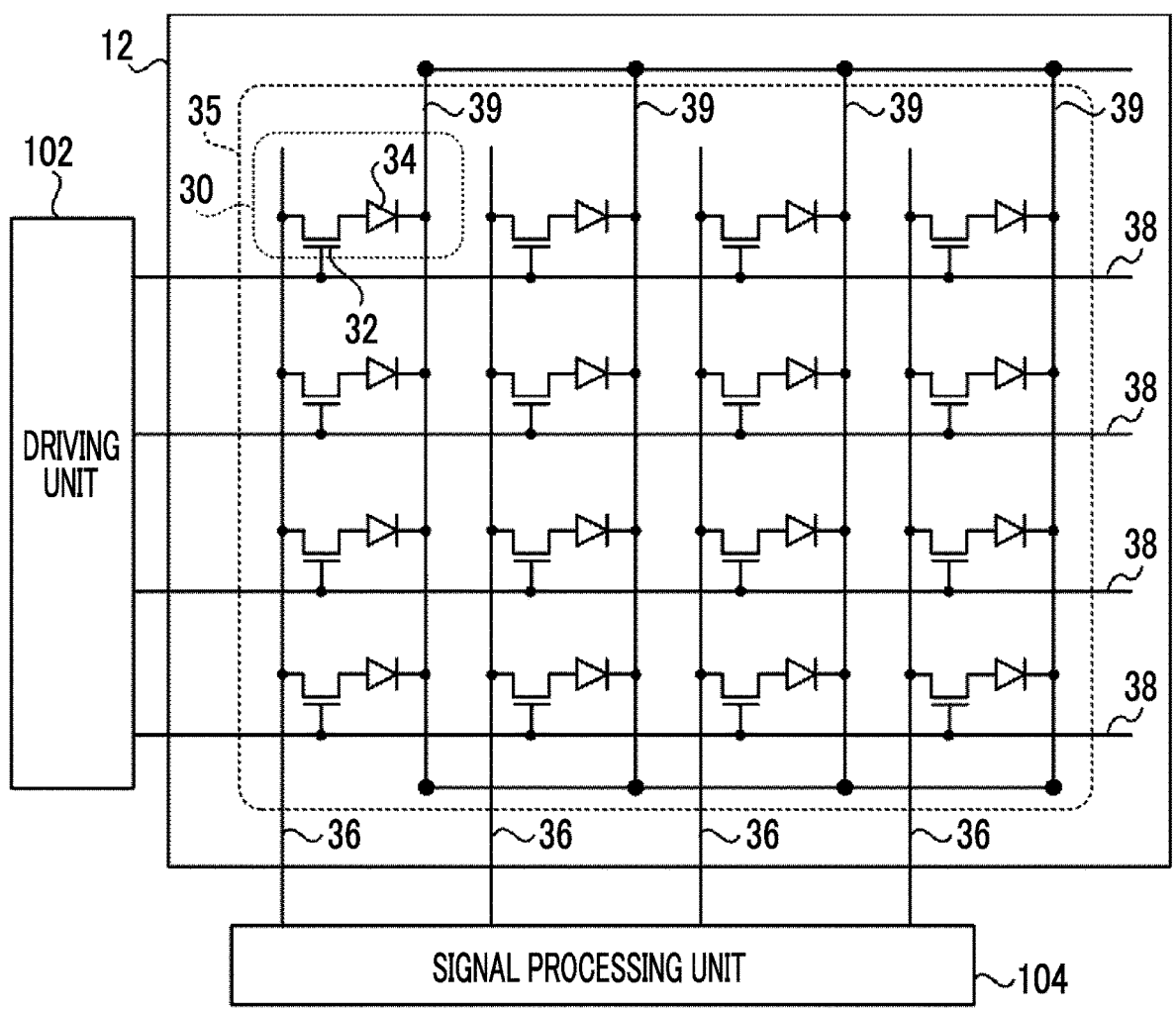
FIG. 2 is a diagram showing an example of a configuration of a radiation detection unit.

The radiation detection unit 12 has a function of generating an electric signal by a charge generated in response to the radiation emitted to the radiation detector 10 and outputting the generated electric signal. FIG. 2 shows an example of a configuration of the radiation detection unit 12 according to the present embodiment. As shown in FIG. 2, in the radiation detection unit 12, a plurality of pixels 30 that generate the charges in response to the radiation or visible light converted from the radiation by a conversion layer such as a scintillator are arranged. For example, the pixels 30 according to the present embodiment are arranged two-dimensionally as shown in FIG. 2. In FIG. 2, the arrangement of the pixels 30 is shown in a simplified manner, for example, 1024×1024 pixels 30 are arranged in a row direction and a column direction.

As shown in FIG. 2, each pixel 30 according to the present embodiment comprises a sensor unit 34 that accumulates the generated charge and a switching element 32 that reads out the charge accumulated in the sensor unit 34. In the present embodiment, for example, a thin film transistor (TFT) is used as the switching element 32. Therefore, in the following, the switching element 32 is referred to as a "TFT 32".

A plurality of scanning wiring lines 38 for controlling a switching state (on and off) of the TFT 32 are provided for each row of the pixels 30. In addition, for each row of the pixels 30, a plurality of signal wiring lines 36 from which the charge accumulated in the sensor unit 34 is read out are provided so as to intersect with the scanning wiring lines 38. Each of the plurality of scanning wiring lines 38 is connected to a driving unit 102 included in the circuit unit 14, so that a drive signal, which is output from the driving unit 102, for driving the TFT 32 and controlling the switching state flows into each of the plurality of scanning wiring lines 38. In addition, each of the plurality of signal wiring lines 36 is connected to a signal processing unit 104 included in the circuit unit 14, so that the charge read out from each pixel 30 is output to the signal processing unit 104 as the electric signal.

In addition, in the sensor unit 34 of each pixel 30, a common wiring line 39 is provided in a wiring line direction of the signal wiring line 36 in order to apply a bias voltage to each pixel 30. By connecting the common wiring line 39 to an external bias power supply (not shown), the bias voltage is applied to each pixel 30 from the bias power supply.

Figure 3:
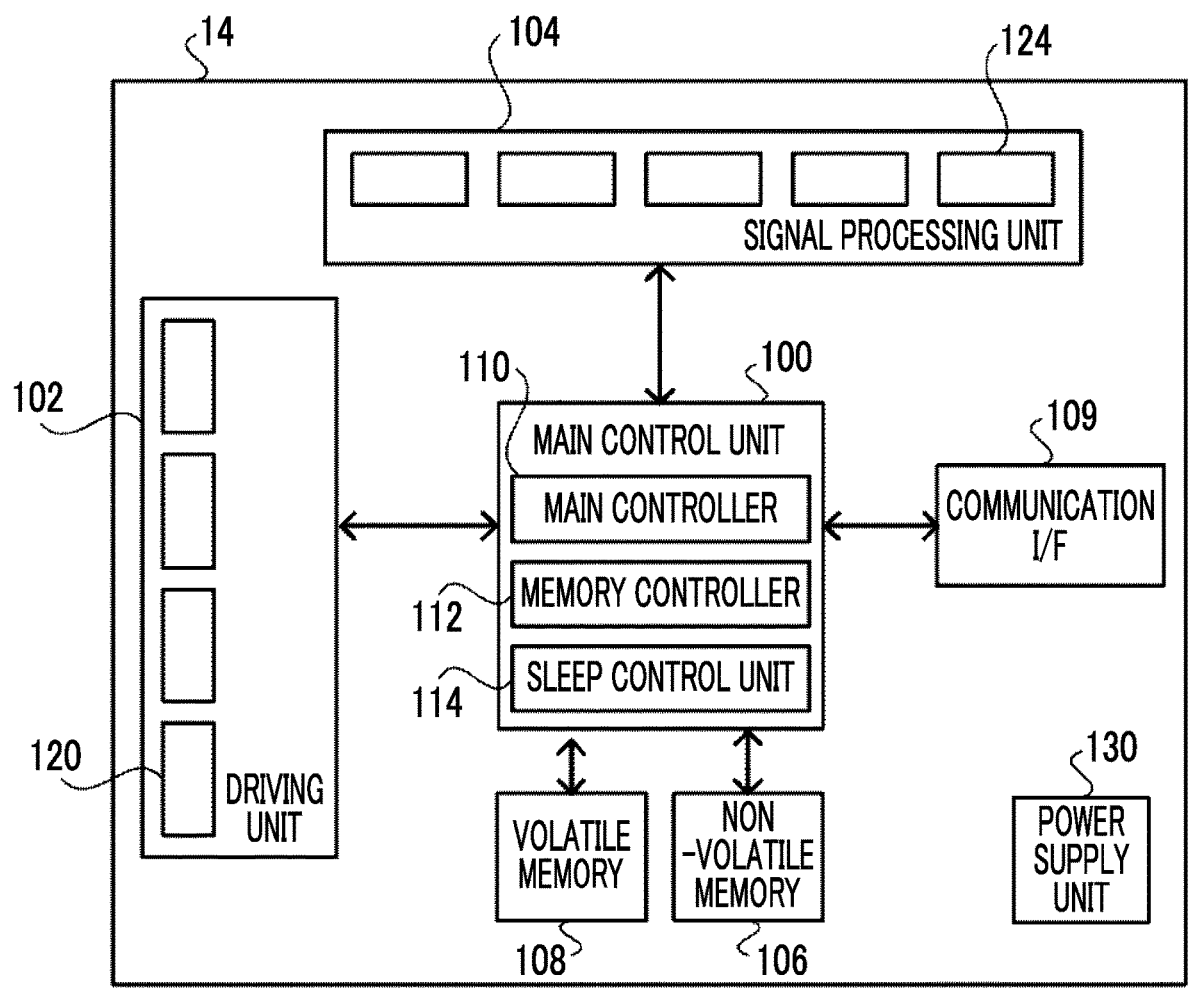
FIG. 3 is a diagram showing an example of a configuration of a circuit unit.

On the other hand, the circuit unit 14 according to the present embodiment includes the driving unit 102 and the signal processing unit 104 described above, and comprises various circuits for controlling the radiation detection unit 12 and generating the radiation image by the radiation detection unit 12. FIG. 3 shows an example of a configuration of the circuit unit 14 according to the present embodiment. As shown in FIG. 3, the circuit unit 14 includes a main control unit 100, the driving unit 102, the signal processing unit 104, a non-volatile memory 106, a volatile memory 108, and a communication interface (I/F) 109.

A power supply unit 130 supplies a power supply power to the main control unit 100, the driving unit 102, the signal processing unit 104, the non-volatile memory 106, the volatile memory 108, the communication I/F 109, and the like. Note that in FIG. 3, in order to avoid complications, the wiring line that connects the power supply unit 130 with each unit is omitted.

The main control unit 100 has a function of controlling an overall operation of the radiation detector 10. As shown in FIG. 3, the main control unit 100 according to the present embodiment includes a main controller 110, a memory controller 112, and a sleep control unit 114. Examples of each of the main controller 110, the memory controller 112, and the sleep control unit 114 include a central processing unit (CPU), a field programmable gate array (FPGA), and the like.

The main controller 110 has a function of controlling the overall operation of the radiation detector 10 with respect to imaging of the radiation image. The main controller 110 is connected to the driving unit 102 described above and controls driving of the driving unit 102. As described above, the driving unit 102 drives the TFT 32 to generate the drive signal for controlling the switching state, and outputs the generated drive signal to the plurality of scanning wiring lines 38. As shown in FIG. 3, the driving unit 102 includes a plurality of drive circuits 120 (for example, four in FIG. 3). The drive circuit 120 is a circuit or a component that generates the drive signal, and is mainly used for digital signal processing. Specific examples of the driving unit 102 include a digital buffer, a bypass capacitor, a pull-up/pull-down resistor, a damping resistor, an electro magnetic compatibility (EMC) countermeasure chip component, and the like.

In addition, the main controller 110 is connected to the signal processing unit 104 described above, and the image data sequentially output from the signal processing unit 104 are sequentially input. The signal processing unit 104 generates the image data in response to the electric signal input from the pixel 30 and sequentially outputs the generated image data to the main control unit 100. As shown in FIG. 3, the signal processing unit 104 includes a plurality of signal processing circuits 124 (for example, five in FIG. 3). The signal processing circuit 124 is a circuit or a component that generates the image data in response to the electric signal input from the pixel 30, and is mainly used for analog signal processing. The signal processing circuit 124 includes an analog front end and the like. Specific examples of the signal processing circuit 124 include an operational amplifier, an analog-to-digital converter (ADC), a digital-to-analog converter (DAC), and the like.

In addition, the main controller 110 is connected to the communication I/F 109, and is connected to an external device such as a console for imaging the radiation image by wireless communication or wired communication via the communication I/F 109. The generated image data representing the radiation image is output to the external device such as the console via the communication I/F 109. The communication I/F 109 according to the present embodiment is an example of a "communication unit" according to the present disclosure.

On the other hand, the sleep control unit 114 has a function of controlling shifting to a sleep mode for reducing the power consumption of the circuit unit 14. The memory controller 112 and the sleep control unit 114 according to the present embodiment are examples of a "processor" according to the present disclosure, and are also examples of a "control device" according to the present disclosure.

The radiation detector 10 according to the present embodiment has two types of the sleep modes of a first power consumption reduction mode and a second power consumption reduction mode for reducing the power consumption in the circuit unit 14. Hereinafter, the first power consumption reduction mode and the second power consumption reduction mode are collectively referred to as the sleep mode.

The first power consumption reduction mode will be described with reference to FIG. 4A. In addition, the second power consumption reduction mode will be described with reference to FIG. 4B. Note that in FIGS. 4A and 4B, a portion in which supply of the power supply power is cut off is shown by hatching.

Figure 4A:
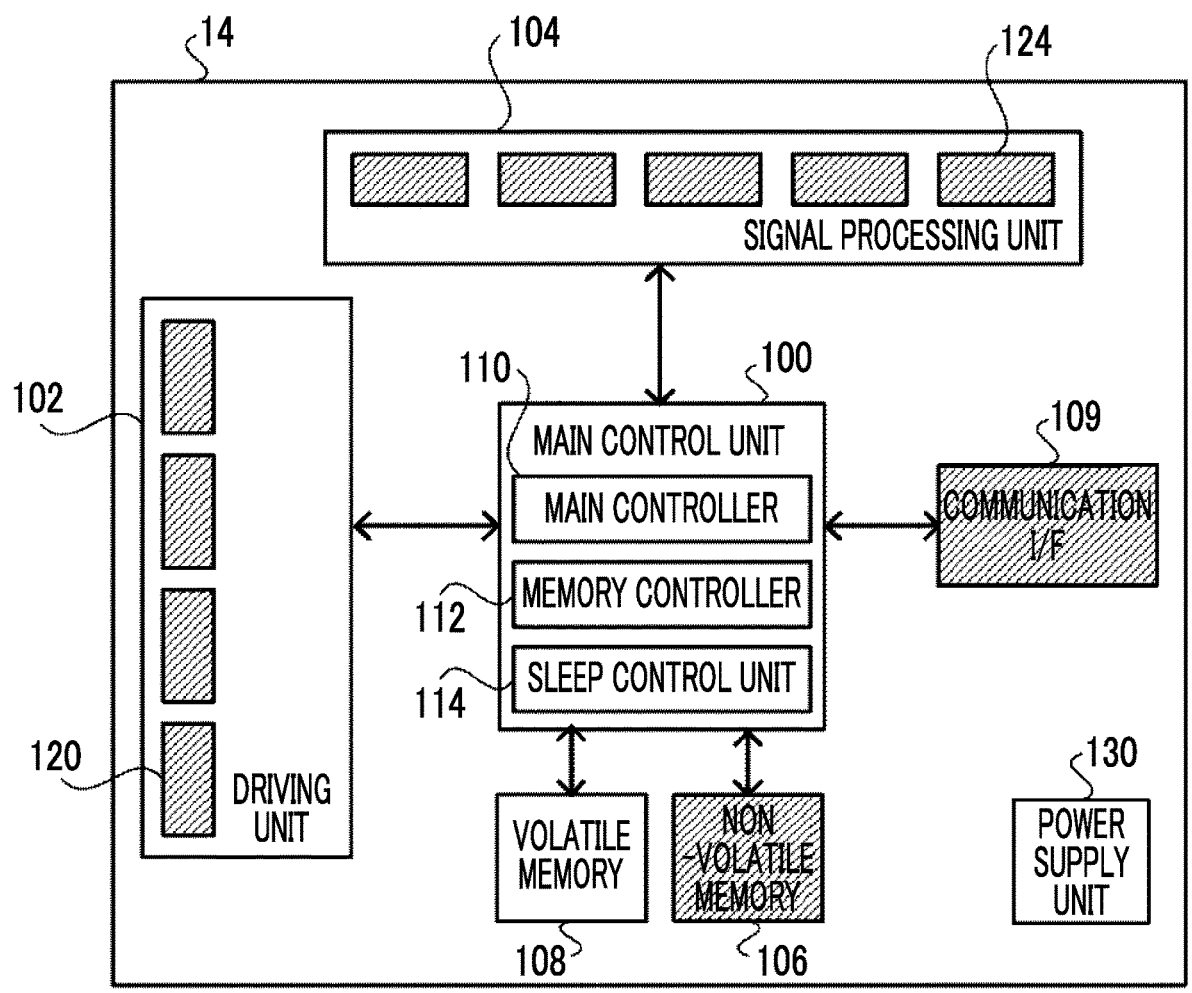
FIG. 4A is a diagram for describing a first power consumption reduction mode.

As shown in FIG. 4A, in the first power consumption reduction mode, the power supply power is supplied from the power supply unit 130 to the main control unit 100. On the other hand, the supply of the power supply power to the drive circuit 120 of the driving unit 102, the signal processing circuit 124 of the signal processing unit 104, the non-volatile memory 106, and the communication I/F 109 is cut off. As described above, in the first power consumption reduction mode according to the present embodiment, the power supply power from the power supply unit 130 remains supplied to the main control unit 100, and the main controller 110, the memory controller 112, and the sleep control unit 114 remains driven. Therefore, the memory controller 112 periodically executes a refresh process of the volatile memory 108, and thus the data stored in the volatile memory 108 is maintained.

Figure 4B:
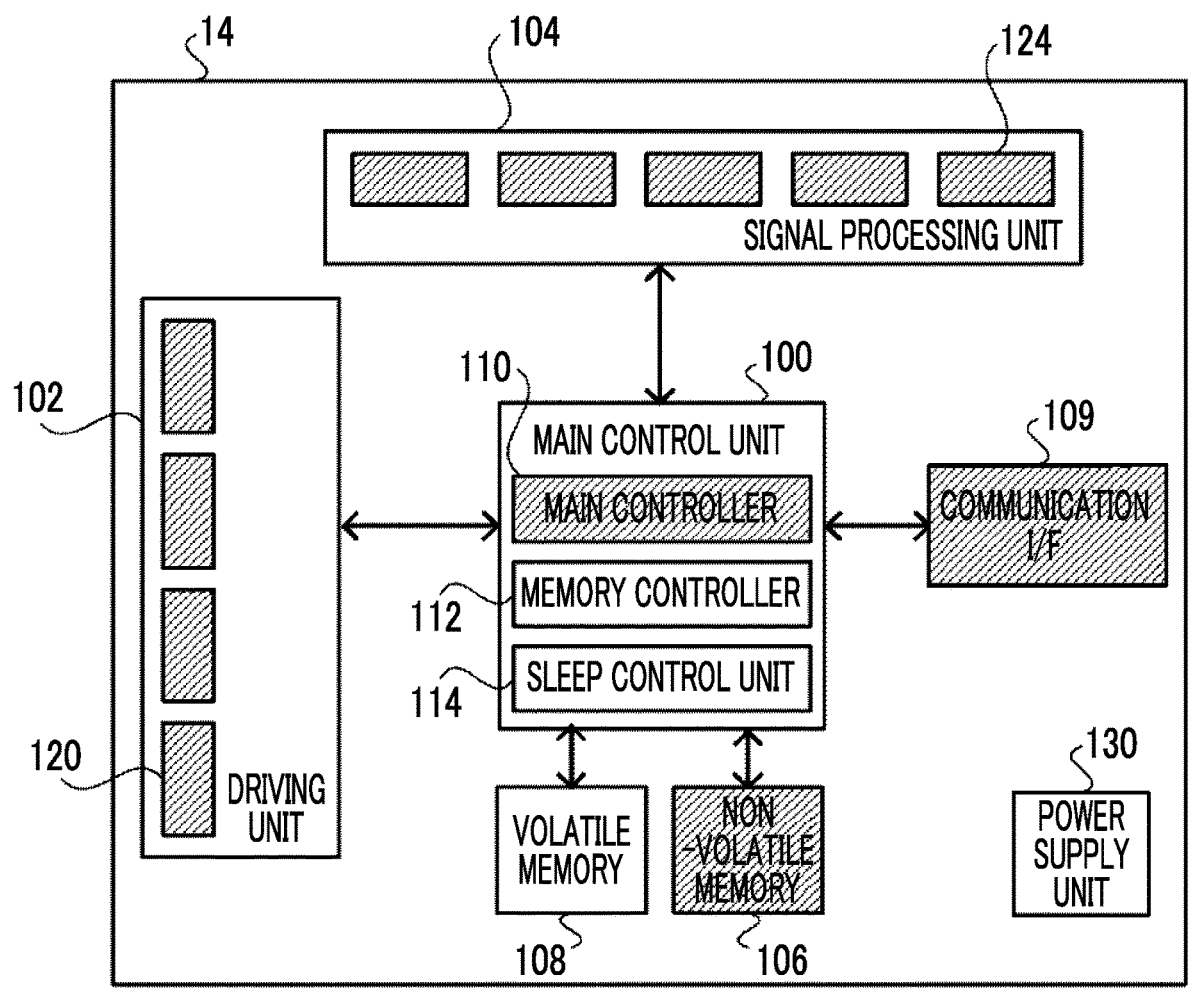
FIG. 4B is a diagram for describing a second power consumption reduction mode.

On the other hand, as shown in FIG. 4B, in the second power consumption reduction mode, the supply of the power supply power to the main controller 110 of the main control unit 100, the drive circuit 120 of the driving unit 102, the signal processing circuit 124 of the signal processing unit 104, the non-volatile memory 106, and the communication I/F 109 is cut off. As described above, in the second power consumption reduction mode according to the present embodiment, the units other than the memory controller 112 and the sleep control unit 114 of the main control unit 100 are set in a sleep state. Therefore, the power consumption is further reduced in the second power consumption reduction mode as compared with the first power consumption reduction mode. In addition, since the power supply power remains supplied to the memory controller 112 of the main control unit 100, the memory controller 112 periodically executes the refresh process of the volatile memory 108 even in the second power consumption reduction mode. Therefore, even in the second power consumption reduction mode, the data stored in the volatile memory 108 is maintained.

Note that the drive circuit 120 of the driving unit 102, the signal processing circuit 124 of the signal processing unit 104, the non-volatile memory 106, and the communication I/F 109 according to the present embodiment are examples of "at least a part other than the main control unit" according to the present disclosure. In addition, the main controller 110 according to the present embodiment is an example of "at least a part of the main control unit" according to the present disclosure.

On the other hand, the memory controller 112 is connected to the non-volatile memory 106, and has a function of controlling the non-volatile memory 106. The image data sequentially output from the signal processing unit 104 are sequentially stored in the non-volatile memory 106 under a control of the memory controller 112. In addition, various data used for generating the radiation image are stored in the non-volatile memory 106. Examples of the non-volatile memory 106 include a flash memory, a Read Only Memory (ROM), and the like.

In addition, the memory controller 112 is connected to the volatile memory 108, and has a function of controlling the volatile memory 108. Various data and the like used for generating the radiation image are stored in the volatile memory 108. Examples of the data stored in the volatile memory 108 include calibration data for calibration, such as data for offset correction. Examples of the volatile memory 108 include the SDRAM (SDR SDRAM: single data rate synchronous dynamic random access memory) or a DDR type SDRAM such as DDR (DDR SDRAM: double data rate synchronous dynamic random access memory). The volatile memory 108 according to the present embodiment is an example of a "volatile storage unit" according to the present disclosure.

The volatile memory 108 needs to periodically execute a deactivation prevention process to prevent deactivation. In a case in which the volatile memory 108 is the SDRAM or the DDR, in order to hold the stored data and maintain the memory effective, it is necessary to periodically execute the refresh process of stabilizing the potential.

The memory controller 112 has a function of causing the volatile memory 108 to execute the refresh process. As described above, since the power supply power is supplied to the memory controller 112 in both the first power consumption reduction mode and the second power consumption reduction mode, the memory controller 112 can execute the refresh process in order to prevent the volatile memory 108 from being deactivated during the second power consumption reduction mode.

Figure 5:
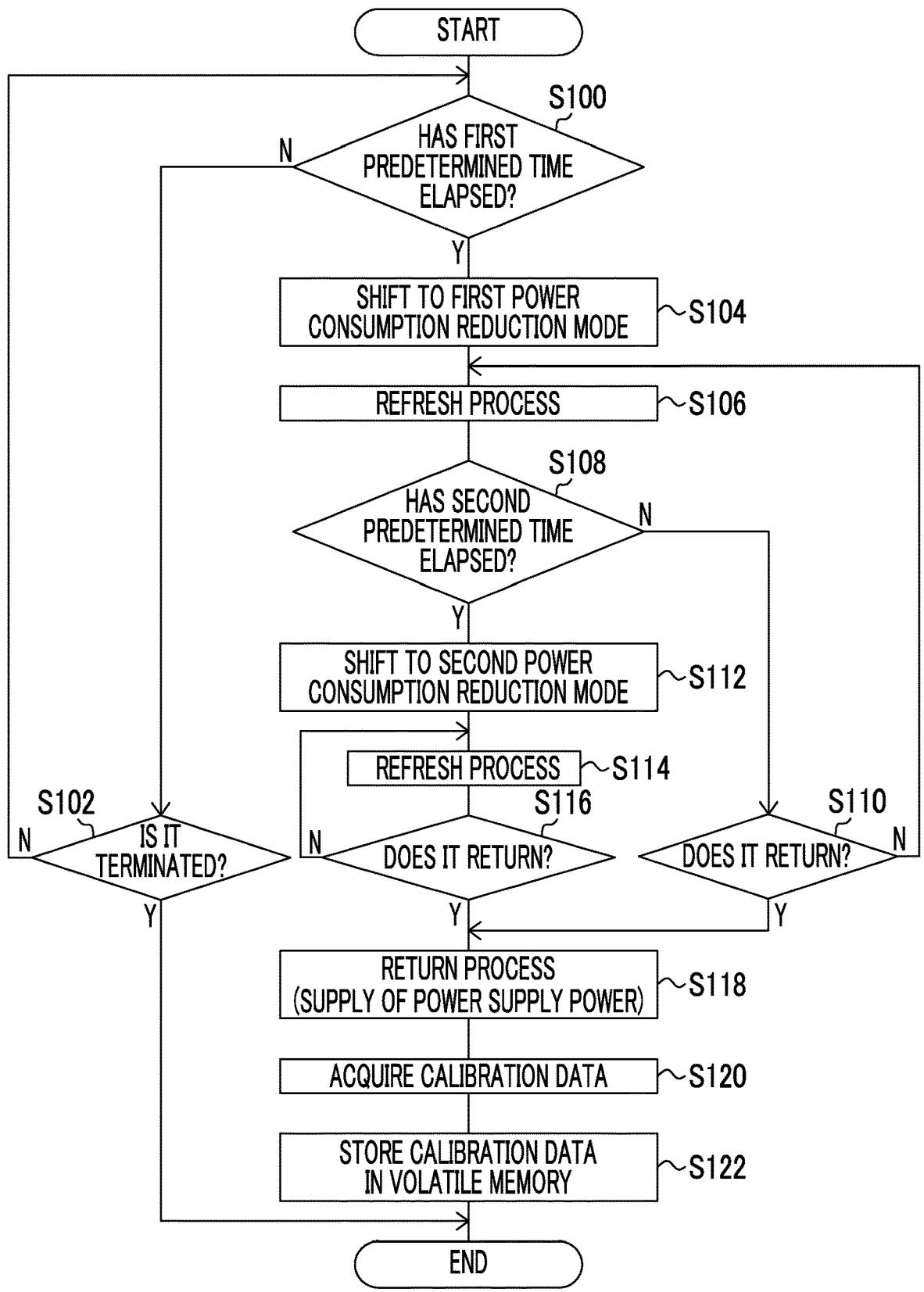
FIG. 5 is a flowchart showing an example of a flow of a sleep process in the radiation detector.

Further, an action of the sleep function in the radiation detector 10 according to the present embodiment will be described with reference to the drawings. FIG. 5 shows a flowchart showing an example of a flow of the sleep process in the radiation detector 10 according to the present embodiment. For example, in the present embodiment, the sleep process shown in FIG. 5 is executed by the main control unit 100 in a case in which the radiation detector 10 does not perform any operation such as imaging the radiation image and the communication I/F 109 does not perform communication with the external device such as the console. Note that an information processing program (not shown) executed by the memory controller 112 and the sleep control unit 114 to execute the sleep process is stored in, for example, the ROM included in the main control unit 100.

In step S100, the sleep control unit 114 determines whether or not first predetermined time has elapsed. For example, in the present embodiment, in a case in which time when the radiation detector 10 does not perform any operation such as imaging the radiation image and the communication I/F 109 does not perform communication with the external device such as the console continues to be equal to longer than the first predetermined time, the sleep control unit 114 shifts to the first power consumption reduction mode. Therefore, in this step, the sleep control unit 114 determines whether or not the first predetermined time has elapsed after the radiation detector 10 does not perform any operation such as imaging the radiation image and the communication I/F 109 does not perform communication with the external device such as the console.

In a case in which the first predetermined time has not elapsed, the determination in step S100 is a negative determination, and the process shifts to step S102. In step S102, the sleep control unit 114 determines whether or not to terminate the sleep process. In at least one case of a case in which the radiation detector 10 performs any operation such as imaging the radiation image or a case in which the communication I/F 109 performs communication with the external device such as the console, the determination in step S102 is a positive determination, and the sleep process is terminated. In a case in which the radiation detector 10 does not perform any operation such as imaging the radiation image and the communication I/F 109 remains not performing communication with the external device such as the console, the determination in step S102 is a negative determination, and the process returns to step S100.

On the other hand, in a case in which the first predetermined time has elapsed after the radiation detector 10 does not perform any operation such as imaging the radiation image and the communication I/F 109 does not perform communication with the external device such as the console, the determination in step S100 is a positive determination, and the process shifts to step S104.

In step S104, the sleep control unit 114 shifts to the first power consumption reduction mode. In the first power consumption reduction mode, as described above with reference to FIG. 4A, the power supply power is supplied from the power supply unit 130 to the main control unit 100, and the supply of the power supply power to the drive circuit 120, the signal processing circuit 124, the non-volatile memory 106, and the communication I/F 109 is cut off.

In subsequent step S106, the memory controller 112 executes the refresh process of the volatile memory 108. By executing the refresh process, the potential of the volatile memory 108 is stabilized even during the first power consumption reduction mode, and the data stored in the volatile memory 108 is maintained.

In subsequent step S108, the sleep control unit 114 determines whether or not second predetermined time has elapsed after shifting to the first power consumption reduction mode. In a case in which the second predetermined time has not yet elapsed after shifting to the first power consumption reduction mode, the determination in step S108 is a negative determination, and the process shifts to step S110.

In step S110, the sleep control unit 114 determines whether or not to return from the first power consumption reduction mode. For example, the sleep control unit 114 according to the present embodiment returns from the sleep mode in a case in which an instruction for returning from the sleep mode is received from a user. The instruction for returning by the user is given, for example, by the user operating an operation unit (not shown) provided in the housing 16 of the radiation detector 10. In a case in which the sleep control unit 114 receives the instruction for returning, the determination in step S110 is a positive determination, and the process shifts to step S118. On the other hand, in a case in which the sleep control unit 114 does not receive the instruction for returning, the determination in step S110 is a negative determination, the process returns to step S106, and the processes of steps S106 and S108 are repeated. Therefore, since the refresh process of the volatile memory 108 is repeatedly executed by the memory controller 112 during the first power consumption reduction mode, the data stored in the volatile memory 108 can be prevented from being lost during the first power consumption reduction mode.

On the other hand, in a case in which the second predetermined time has elapsed after shifting to the first power consumption reduction mode, the determination in step S108 is a positive determination, and the process shifts to step S112.

In step S112, the sleep control unit 114 shifts to the second power consumption reduction mode. In the second power consumption reduction mode, as described above with reference to FIG. 4B, the power supply power is supplied from the power supply unit 130 to the memory controller 112 and the sleep control unit 114, and the supply of the power supply power to the main controller 110, the drive circuit 120, the signal processing circuit 124, the non-volatile memory 106, and the communication I/F 109 is cut off.

In subsequent step S114, the memory controller 112 executes the refresh process of the volatile memory 108 in the same manner as in step S106 described above. By executing the refresh process, the potential of the volatile memory 108 is stabilized even during the second power consumption reduction mode, and the data stored in the volatile memory 108 is maintained.

In step S116, the sleep control unit 114 determines whether or not to return from the second power consumption reduction mode. For example, in the present embodiment, a return condition for returning from the second power consumption reduction mode is the same as a return condition for returning from the first power consumption reduction mode described in step S110. That is, in a case in which the sleep control unit 114 receives the instruction for returning, the determination in step S116 is a positive determination, and the process shifts to step S118. On the other hand, in a case in which the sleep control unit 114 does not receive the instruction for returning, the determination in step S116 is a negative determination, the process returns to step S114, and the process of step S114 is repeated. Therefore, since the refresh process of the volatile memory 108 is repeatedly executed by the memory controller 112 during the second power consumption reduction mode, the data stored in the volatile memory 108 can be prevented from being lost during the second power consumption reduction mode.

In step S118, the sleep control unit 114 executes a return process of returning from the first power consumption reduction mode or the second power consumption reduction mode. Specifically, a process of supplying the power supply power to each unit to which the supply of the power supply power is cut off is executed.

In subsequent step S120, the sleep control unit 114 acquires the calibration data used for calibration of the radiation image. For example, in the present embodiment, the sleep control unit 114 outputs a signal indicating timing of acquiring the calibration data. In a case in which the signal is input from the sleep control unit 114, the main controller 110 drives the driving unit 102 and the signal processing unit 104 to cause the radiation detection unit 35 to perform an imaging operation. By performing the imaging operation, the image data in response to the electric signal output from the radiation detection unit 35 is generated in a state in which the radiation is not emitted. The main controller 110 acquires the image data output from the radiation detection unit 35, as the calibration data.

The calibration data includes data that is not easily affected by an environmental change or a temporal change of the radiation detector 10 and data that is easily affected by the environmental change or the temporal change of the radiation detector 10. In a case of the data that is not easily affected by the environmental change or the temporal change, even after the sleep mode, the calibration data stored in the volatile memory 108 and the required calibration data are the same. On the other hand, in a case of the data that is easily affected by the environmental change or the temporal change, after the sleep mode, the calibration data stored in the volatile memory 108 may be different from the required calibration data due to the influence of the environmental change or the temporal change during the sleep mode.

Therefore, in this step, the calibration data that is easily affected by the environmental change or the temporal change is acquired after returning from the sleep mode and stored in the volatile memory 108. Therefore, appropriate calibration data is stored in the volatile memory 108.

Note that as described above, in this step, the calibration data that is easily affected by the environmental change or the temporal change need only be acquired, and it is not necessary to acquire the calibration data that is not easily affected by the environmental change or the temporal change. In addition, the acquisition of the calibration data and the storage in the volatile memory 108 in this step are not essential. For example, in a case in which the environmental change or the temporal change can be ignored, or in a case in which a period of time of shifting to the second power consumption reduction mode is short, this step (S120) and subsequent step S122 may be omitted.

In addition, in the present embodiment, an aspect in which the calibration data is acquired has been described, but the acquisition after returning from the sleep mode is not limited to the calibration data. As described above, the acquisition is not particularly limited as long as it is data that is easily affected by the environmental change or the temporal change during the sleep mode.

In subsequent step S122, the memory controller 112 stores the calibration data acquired by the main controller 110 at a predetermined address of the volatile memory 108. In a case in which the process of step S122 is terminated, the sleep process shown in FIG. 5 is terminated.

MODIFICATION EXAMPLE 1

In the aspect described above, an aspect has been described in which the memory controller 112 of the main control unit 100 executes the refresh process of the volatile memory 108. On the other hand, according to the present modification example, an aspect will be described in which the refresh process is executed by a device other than the memory controller 112 of the main control unit 100.

Figure 6:
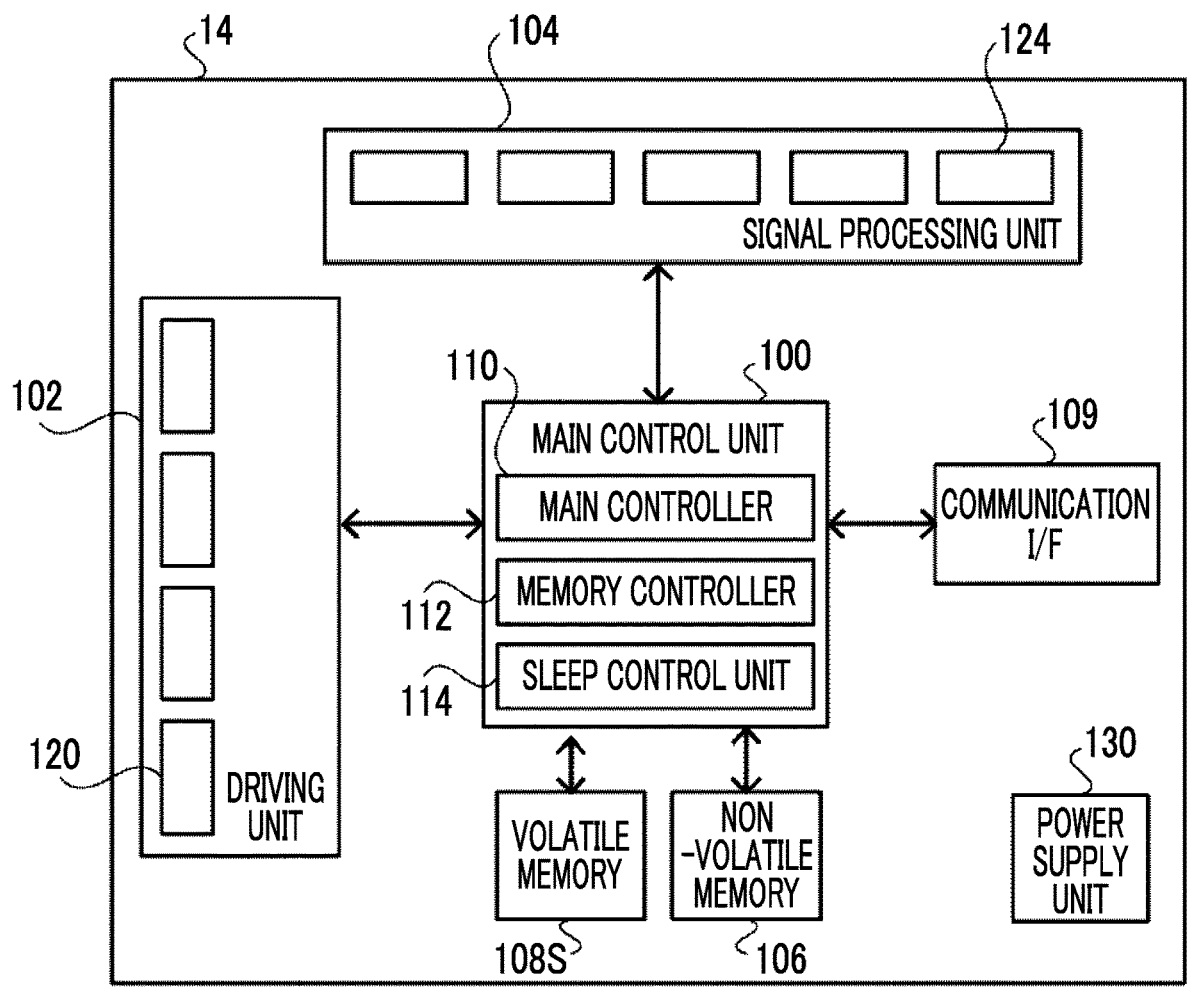
FIG. 6 is a diagram showing an example of a configuration of a circuit unit according to Modification Example 1.

FIG. 6 shows an example of a configuration of the circuit unit 14 according to the present modification example. As shown in FIG. 6, the circuit unit 14 according to the present modification example is different from the circuit unit 14 (see FIG. 3) according to the aspect described above in that a volatile memory 108S is provided instead of the volatile memory 108. The volatile memory 108S according to the present modification example can execute so-called self refresh process, in which the refresh process is executed by the volatile memory 108S itself without an external control such as the memory controller.

According to the present modification example, the memory controller 112 executes the refresh process of the volatile memory 108S in a case other than the sleep mode and in the first power consumption reduction mode. On the other hand, in a case of the second power consumption reduction mode, the volatile memory 108S executes the self refresh process. Therefore, the memory controller 112 performs setting to cause the volatile memory 108S to execute the self refresh process in a case of shifting to the second power consumption reduction mode. In addition, in a case of returning from the second power consumption reduction mode, the memory controller 112 performs setting not to cause the volatile memory 108S to execute the self refresh process.

In addition, in the sleep control unit 114 according to the present modification example, a target to which the supply of the power supply power is cut off in the second power consumption reduction mode is different from the aspect described above. The second power consumption reduction mode according to the present modification example will be described with reference to FIG. 7.

Figure 7:
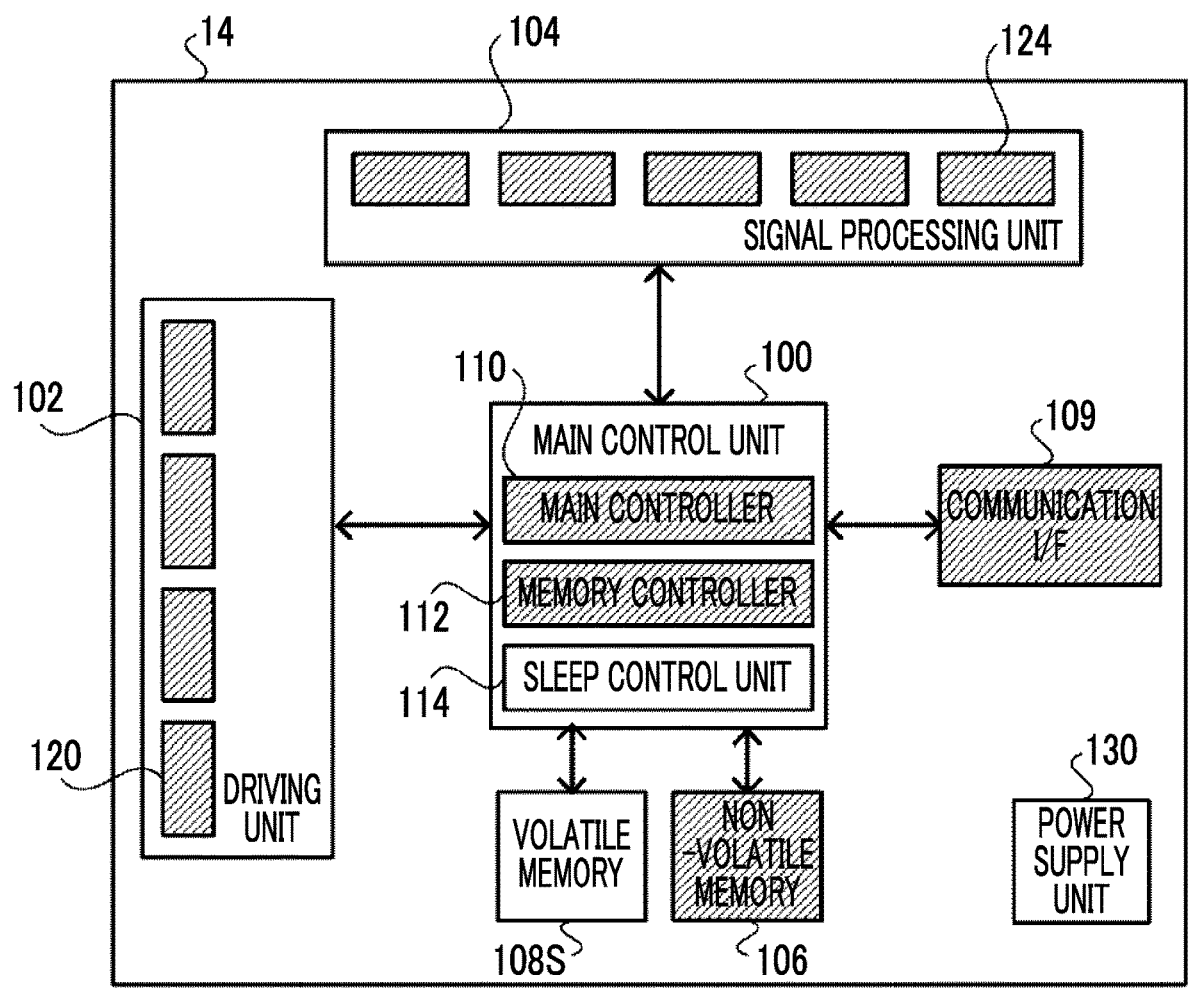
FIG. 7 is a diagram for describing a second power consumption reduction mode according to Modification Example 1.

As shown in FIG. 7, the second power consumption reduction mode according to the present modification example is different from the second power consumption reduction mode according to the aspect described above in that the supply of the power supply power to the memory controller 112 of the main control unit 100 is further cut off (see FIG. 4B). As described above, according to the present modification example, since the volatile memory 108S executes the self refresh process during the second power consumption reduction mode, even in a case in which the supply of the power supply power to the memory controller 112 is cut off and it is the sleep state, the volatile memory 108S is refreshed. Therefore, even in the second power consumption reduction mode, the data stored in the volatile memory 108 is maintained.

In addition, FIG. 8 shows a flowchart showing an example of a flow of the sleep process in the radiation detector 10 according to the present modification example. The sleep process shown in FIG. 8 is different from the sleep process (see FIG. 5) of the aspect described above in that step S111 is provided before step S112. In addition, the present modification example is different from the aspect described above in that step S115 is provided instead of step S114. Further, the present modification example is different from the aspect described above in that step S119 is provided between step S118 and step S120.

In the present modification example, as shown in FIG. 8, in step S111, the memory controller 112 performs setting to cause the volatile memory 108S to execute the self refresh process as described above. Note that in next step S112, the sleep control unit 114 shifts to the second power consumption reduction mode, but as described above, the sleep control unit 114 also cuts off the supply of the power supply power to the memory controller 112.

In addition, in step S115, the volatile memory 108 executes the self refresh process as described above. By executing the self refresh process, even during the second power consumption reduction mode and the memory controller 112 sleeps, the potential of the volatile memory 108S is stabilized and the data stored in the volatile memory 108S is maintained.

In addition, in step S119, the memory controller 112 terminates the self refresh process of the volatile memory 108S. Note that in a case of returning from the first power consumption reduction mode, the volatile memory 108S does not execute the self refresh process, so that this step can be omitted.

As described above, the radiation detector 10 according to the embodiment described above comprises the memory controller 112 and the sleep control unit 114 in the housing 16 of the radiation detector 10 including the main control unit 100, the radiation detection unit 12 that generates the electric signal by the charge generated in response to the emitted radiation and outputs the generated electric signal, the driving unit 102 that drives the radiation detection unit 12 in response to the control of the main control unit 100, the signal processing unit 104 that generates the image data in response to the electric signal input by the radiation detection unit 12, the communication I/F 109 that performs communication with the outside wirelessly or by wire, the volatile memory 108, and the power supply unit 130 that supplies the power supply power to the main control unit 100, the driving unit 102, the signal processing unit 104, the communication I/F 109, and the volatile memory 108. The sleep control unit 114 supplies the power supply power to the main control unit 100 and cuts off supply of the power supply power to at least a part other than the main control unit 100 in a first power consumption reduction mode. In addition, the sleep control unit 114 cuts off supply of the power supply power to at least a part of the main control unit 100 and at least a part other than the main control unit 100 in a second power consumption reduction mode. In addition, the memory controller 112 prevents the volatile memory 108 from being deactivated during the second power consumption reduction mode.

As described above, in the radiation detector 10 of each of the aspects described above, even during the second power consumption reduction mode in which the main controller 110 of the main control unit 100 is also in the sleep state in order to suppress the power consumption, the refresh process of preventing the volatile memory 108 from being deactivated is repeatedly executed. By executing the refresh process, the potential of the volatile memory 108 is stabilized even during the second power consumption reduction mode, and the data stored in the volatile memory 108 is maintained. Therefore, in a case of returning from the sleep mode, it is not necessary to execute a process of re-storing all the data such as the calibration data that should be stored in the volatile memory 108. Therefore, with the memory controller 112 and the sleep control unit 114 of each of the aspects described above, it is possible to promptly perform a return from the sleep mode for suppressing power consumption.

In addition, according to each of the aspects described above, in the second power consumption reduction mode, the main controller 110 of the main control unit 100, which consumes more power than the others, can be in the sleep state, so that the power consumption can be further reduced.

Note that according to each of the aspects described above, an aspect has been described in which the calibration data is acquired and stored in the volatile memory 108 even in a case of returning from the first power consumption reduction mode, but it is not necessary to acquire the calibration data in a case of returning from the first power consumption reduction mode. A period of time of the first power consumption reduction mode is relatively short and it is not necessary to consider the influence of the environmental change or the temporal change, and thus it is not necessary to acquire the calibration data regardless of a type thereof.

In addition, in each of the aspects described above, the timing of shifting to the sleep mode is determined in response to the time when the radiation detector 10 does not perform any operation such as the imaging operation of the radiation image and the communication I/F 109 does not perform communication with the external device such as the console, but the timing of shifting to the sleep mode is not limited to this aspect. For example, time when the sleep control unit 114 receives an instruction for shifting to the sleep mode from the user may be the timing of shifting to the sleep mode. The instruction for shifting by the user need only be given, for example, by the user operating the operation unit (not shown) provided in the housing 16 of the radiation detector 10.

In addition, in each of the aspects described above, an aspect of shifting to the second power consumption reduction mode after shifting to the first power consumption reduction mode has been described, but the present disclosure is not limited to this aspect, and an aspect of shifting to the second power consumption reduction mode directly without the first power consumption reduction mode may be adopted. For example, an aspect of, in a case of shifting to the sleep mode in a case in which the instruction for shifting is received from the user as described above, shifting to the first power consumption reduction mode by the user pressing the operation unit lightly and shifting to the second power consumption reduction mode by the user long pressing the operation unit may be adopted.

In addition, in each of the aspects described above, the timing of returning from the sleep mode is at least one of time when the radiation detector 10 performs any operation such as the imaging operation of the radiation image or time when the communication I/F 109 performs communication with the external device such as the console, but the timing of returning is not limited to this aspect. For example, time when information is input from an external device, such as time when an imaging menu is input to the radiation detector 10 from the console or, may be the timing of returning from the sleep mode. In addition, for example, the radiation detector 10 may be provided with a movement detection sensor such as a gyro sensor, and timing when the movement detection sensor detects that the radiation detector 10 is moved may be the timing of returning from the sleep mode.

Note that in each of the aspects described above, an aspect has been adopted in which main control unit 100 comprises the memory controller 112 and the sleep control unit 114, but at least one of the memory controller 112 or the sleep control unit 114 may be provided outside the main control unit 100. In a case in which the memory controller 112 and the sleep control unit 114 are provided outside the main control unit 100, the entire main control unit 100 can be set in the sleep state in the second power consumption reduction mode.

In addition, in each of the first power consumption reduction mode and the second power consumption reduction mode, a portion to which the power supply power is supplied, in other words, a portion to which the power supply power supply is cut off is not limited to each of the aspects described above. The supply of the power supply power to the drive circuit 120 of the driving unit 102 and the signal processing circuit 124 of the signal processing unit 104 need only be cut off in both the first power consumption reduction mode and the second power consumption reduction mode, and the supply of the power supply power to the main controller 110 of the main control unit 100 need only be cut off in the second power consumption reduction mode. In addition, except for the above-described portion provided in the circuit unit 14 of the radiation detector 10, the power supply power can be appropriately cut off in the sleep mode. For example, in a case in which the housing 16 of the radiation detector 10 is provided with a display unit that displays various information, the circuit unit 14 comprises a display control unit that controls the display on the display unit. By setting the display control unit in the sleep state, the power consumption can be further reduced. On the other hand, by not setting the radiation detector 10 in the sleep state, information indicating that the radiation detector 10 is in the sleep mode can be displayed, so that the user can recognize that the radiation detector 10 shifts the sleep mode. Therefore, whether or not to set the display control unit in the sleep state may be appropriately set.

In addition, in the first power consumption reduction mode and the second power consumption reduction mode, an aspect has been described in which a target to which the refresh process is executed is all of the volatile memories 108 and 108S, but the target to which the refresh process is executed is not limited to this aspect, and a partial region may be adopted. In other words, an aspect may be adopted in which the refresh process is executed on a part of the address of the volatile memories 108 and 108S. For example, in a region in which the refresh process is not executed, there is a concern that the stored data is lost. Therefore, an aspect may be adopted in which the refresh process is executed during the sleep mode only in a region in which the data that is not desired to be lost is stored. In addition, for example, an aspect may be adopted in which the refresh process may be executed during the sleep mode only in a region used immediately after returning.

In addition, in each of the aspects described above, examples of the "deactivation" according to the present disclosure include loss of the data stored in the volatile memory 108, and examples of the "deactivation prevention process" include the refresh process, but the "deactivation" and the "deactivation prevention process" according to the present disclosure is not limited thereto.

In addition, for example, as a hardware structure of the processing unit such as the main controller 110 and the memory controller 112, various processors shown below can be used. The various processors include, in addition to the above-described CPU, which is a general-purpose processor which executes software (program) and functions as various processing units, a programmable logic device (PLD) which is a processor whose circuit configuration can be changed after manufacture, such as a field programmable gate array (FPGA), and a dedicated electric circuit which is a processor having a circuit configuration which is designed for exclusive use in order to execute specific processing, such as an application specific integrated circuit (ASIC).

Each of the main controller 110 and the memory controller 112 may be configured by one of these various processors or may be configured by a combination of two or more processors of the same type or different types (for example, a combination of a plurality of the FPGAs, or a combination of the CPU and the FPGA). In addition, a plurality of the processing units may be configured by one processor.

Examples of the configuration in which the memory controller 112 and the sleep control unit 114 are configured by one processor include, first, an aspect in which one processor is configured by a combination of one or more CPUs and software and this processor functions as a plurality of processing units. Second, the examples thereof include, as represented by a system on chip (SoC) or the like, an aspect of using a processor for realizing the functions of the entire system including a plurality of processing units with one integrated circuit (IC) chip. In this way, various processing units are configured by one or more of various processors described above as the hardware structure.

Further, the hardware structure of these various processors is, more specifically, an electric circuit (circuitry) in which circuit elements such as semiconductor elements are combined.

In addition, in the embodiment described above, an aspect has been described in which the information processing program is stored (installed) in the ROM in advance, but the present disclosure is not limited to this. An aspect may be adopted in which the information processing program is recorded in the recording medium such as a compact disc read only memory (CD-ROM), a digital versatile disc read only memory (DVD-ROM), and a universal serial bus (USB) memory. In addition, an aspect may be adopted in which the information processing program is downloaded from an external device via a network.

What is claimed is:

1. A control device
for use in a housing of a radiation detector that includes:
  a main control unit,
    a radiation detection unit that generates an electric signal by a charge generated in response to emitted radiation and outputs the generated electric signal,
    a driving unit that drives the radiation detection unit in response to a control of the main control unit,
    a signal processing unit that generates image data in response to the electric signal input from the radiation detection unit,
    a communication unit that performs communication with an outside wirelessly or by wire,
    a volatile storage unit, and
    a power supply unit that supplies a power supply power to the main control unit, the driving unit, the signal processing unit, the communication unit, and the storage unit,
  the control device comprising at least one processor that is configured to:
    supply the power supply power to the main control unit and cuts off supply of the power supply power to at least a part other than the main control unit in a first power consumption reduction mode,
    cut off supply of the power supply power to at least a main controller of the main control unit and at least a part other than the main control unit in a second power consumption reduction mode, and
    prevent the storage unit from being deactivated during the second power consumption reduction mode, by supplying the power supply power to a memory controller of the main control unit.

2. The control device according to claim 1,
wherein the processor is configured to perform a setting to cause the storage unit to perform a deactivation prevention process during the second power consumption reduction mode in a case in which the processor shifts to the second power consumption reduction mode.

3. The control device according to claim 1,
wherein the deactivation prevention process is a refresh process for SDRAM.

4. The control device according to claim 1,
wherein the deactivation prevention process is a refresh process for DDR-type SDRAM.

5. The control device according to claim 1,
wherein the processor is configured to acquire the image data in response to the electric signal output from the radiation detection unit, in a state in which the radiation is not emitted, and to store the acquired image data in the storage unit in a case in which the processor returns from the first power consumption reduction mode or the second power consumption reduction mode.

6. A radiation detector comprising:
the control device according to claim 1;
the main control unit;
the radiation detection unit that generates an electric signal by a charge generated in response to emitted radiation and outputs the generated electric signal;
the driving unit that drives the radiation detection unit in response to a control of the main control unit;
the signal processing unit that generates image data in response to the electric signal input from the radiation detection unit;
the communication unit that performs communication with an outside wirelessly or by wire; and
the volatile storage unit.

7. A control device
for use in a housing of a radiation detector including that includes:
  a main control unit,
    a radiation detection unit that generates an electric signal by a charge generated in response to emitted radiation and outputs the generated electric signal,
    a driving unit that drives the radiation detection unit in response to a control of the main control unit,
    a signal processing unit that generates image data in response to the electric signal input from the radiation detection unit,
    a communication unit that performs communication with an outside wirelessly or by wire,
    a volatile storage unit, and
    a power supply unit that supplies a power supply power to the main control unit, the driving unit, the signal processing unit, the communication unit, and the storage unit,
  the control device comprising a processor configured to:
    cut off supply of the power supply power to at least a main controller of the main control unit and at least a part other than the main control unit in a power consumption reduction mode, and
    prevent the storage unit from being deactivated during the power consumption reduction mode, by supplying the power supply power to a memory controller of the main control unit.

8. A control method executed by a processor provided in a housing of a radiation detector including a main control unit, a radiation detection unit that generates an electric signal by a charge generated in response to emitted radiation and outputs the generated electric signal, a driving unit that drives the radiation detection unit in response to a control of the main control unit, a signal processing unit that generates image data in response to the electric signal input from the radiation detection unit, a communication unit that performs communication with an outside wirelessly or by wire, a volatile storage unit, and a power supply unit that supplies a power supply power to the main control unit, the driving unit, the signal processing unit, the communication unit, and the storage unit, the method comprising:

supplying the power supply power to the main control unit and cutting off supply of the power supply power to at least a part other than the main control unit in a first power consumption reduction mode, cutting off supply of the power supply power to at least a main controller of the main control unit and at least a part other than the main control unit in a second power consumption reduction mode, and preventing the storage unit from being deactivated during the second power consumption reduction mode, by supplying the power supply power to a memory controller of the main control unit.

9. A non-transitory computer-readable storage medium storing a control program that causes a processor provided in a housing of a radiation detector including a main control unit, a radiation detection unit that generates an electric signal by a charge generated in response to emitted radiation and outputs the generated electric signal, a driving unit that drives the radiation detection unit in response to a control of the main control unit, a signal processing unit that generates image data in response to the electric signal input from the radiation detection unit, a communication unit that performs communication with an outside wirelessly or by wire, a volatile storage unit, and a power supply unit that supplies a power supply power to the main control unit, the driving unit, the signal processing unit, the communication unit, and the storage unit, to execute a process comprising:

supplying the power supply power to the main control unit and cutting off supply of the power supply power to at least a part other than the main control unit in a first power consumption reduction mode;

cutting off supply of the power supply power to at least a main controller of the main control unit and at least a part other than the main control unit in a second power consumption reduction mode; and preventing the storage unit from being deactivated during the second power consumption reduction mode, by supplying the power supply power to a memory controller of the main control unit.

\* \* \* \* \*